INVENTOR.
Rocco Poppa
BY James E. Tracy
Attorney

Feb. 10, 1970 R. POPPA 3,495,031

VARIABLE Q I.F. AMPLIFIER CIRCUIT FOR A TELEVISION RECEIVER

Filed Nov. 1, 1967 2 Sheets-Sheet 2

INVENTOR.
Rocco Poppa
BY James E. Tracy
Attorney

United States Patent Office 3,495,031
Patented Feb. 10, 1970

3,495,031

VARIABLE Q I.F. AMPLIFIER CIRCUIT FOR A TELEVISION RECEIVER

Rocco Poppa, Addison, Ill., assignor to Zenith Radio Corporation, Chicago, Ill., a corporation of Delaware Filed Nov. 1, 1967, Ser. No. 679,689
Int. Cl. H04n 7/04
U.S. Cl. 178—5.8 14 Claims

ABSTRACT OF THE DISCLOSURE

To facilitate optimum tuning under both strong and weak signal conditions, different frequency response characteristics for those two conditions are obtained in a plural-stage transistorized intermediate frequency channel by varying, in accordance with variations in received signal strength, the Q of a tuned circuit included in an interstage network coupling one of the transistor amplifying devices to another such device. The Q is made dependent on the output resistance of the aforementioned one transistor and that resistance is controlled by an applied automatic gain control voltage.

Figure 1:
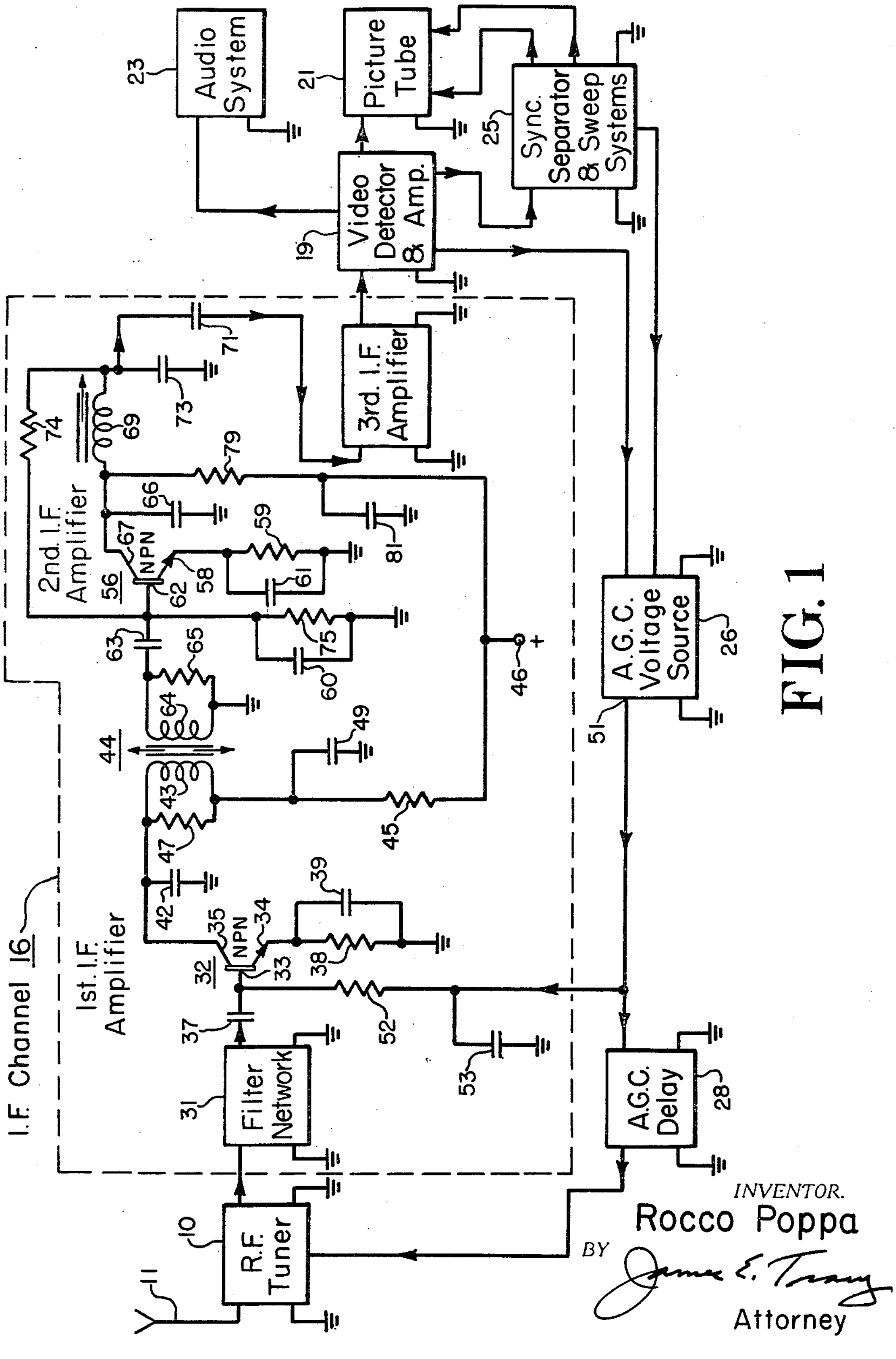

This invention pertains to a novel intermediate frequency (or IF) amplifying channel having a frequency response characteristic the shape of which changes with variations in received signal strength to enhance performance. The invention finds particular utility in an intercarrier type television receiver wherein the intermediate frequency signal, to be amplified by the IF channel, contains an amplitude modulated picture IF carrier and a frequency modulated sound IF carrier having a fixed frequency separation from one to another, and will be described in such an environment.

Intermediate frequency channels for intercarrier type television receivers have been developed in which their frequency response or band pass curves are made dependent on the strength of received television signals. These amplifying channels are so controlled that portions of their response characteristics are altered upon the occurrence of a particular change in the incoming signal strength. For example, arrangements are known for boosting or peaking the response in the vicinity of either the picture carrier, or sound carrier, or both, to improve performance during the presence of weak signal or fringe-area reception.

Moreover, in another known IF channel the response curve has been given a particular shape for weak signal conditions (different than its shape under strong or normal signal conditions) so that sound tuning will be enhanced and optimized when the viewer adjusts the radio frequency (or RF) tuner of his television set for the best picture (namely the picture with the highest video signal to noise ratio), and this will be accomplished by actually detuning or mistuning the RF tuner slightly to a tuning condition different from that required to produce the most satisfactory image during strong signal reception.

To explain, the IF signal is developed in the RF tuner by heterodyning or beating a received television signal, which includes frequency spaced modulated picture and sound RF carriers, with a heterodying signal generated by a variable frequency local oscillator which is included in the tuner. The particular frequencies of the picture and sound IF carriers of the IF signal are determined by the operating frequency of the heterodyne oscillator, which frequency may be adjusted by the viewer by manipulation of the fine tuning control of his television receiver. The response characteristic of the IF channel has a bandwidth and shape to accommodate both the picture and sound IF carriers as well as their bands of modulation components, and under strong or normal signal conditions optimum tuning of both picture and sound is achieved when the viewer adjusts the heterodyne oscillator so that the picture and sound IF carriers fall on opposite slopes or skirts of the response curve. Furthermore, for best operation the response characteristic is shaped so that the sound IF carrier normally falls well down on its associated skirt and thus very near one end of the pass-band. Beyond the ends of the pass-band, the response usually is attenuated rather sharply in order to prevent interference from the IF carriers developed in the RF tuner from the RF carriers transmitted in adjacent television channels. With respect to the side of the pass-band in which the sound IF carrier is established, a trap usually is provided and is tuned to the adjacent channel picture IF carrier frequency.

The viewer, of course, tends to adjust his fine tuning control to the point at which he sees the most satisfactory image on his picture tube screen. However, under weak signal conditions the best image reproduction often is obtained at the expense of actually detuning the receiver so as to move the picture IF carrier inwardly (toward the center of the pass-band) to a higher response or gain portion of the frequency response characteristic, which at the same time moves the sound IF carrier outwardly of the pass-band to a point where the sound amplification is too low to result in proper sound reproduction. This problem has been remedied in the prior art by reshaping or modifying the response curve for weak signal reception and boosting the response at the frequency to which the sound IF carrier is detuned. Satisfactory sound reproduction is thus realized when picture reproduction is optimized.

Previously developed IF channels having differently shaped response curves for strong and weak signal conditions suffer, however, from one or more of the following disadvantages and shortcomings: There is a sacrifice in skirt selectivity; the required circuitry is complex and adds significantly to the cost of the television receiver; degeneration is introduced so that the maximum amplification of which the IF channel is capable can never be obtained; or the approach employed for achieving variable shaped response curves does not lend itself to transistorization.

The present invention overcomes all of these shortcomings and disadvantages. Differently shaped response curves are achieved in a transistorized IF channel at minimal cost, without any degradation of skirt attenuation, and without the introduction of any degeneration.

The invention is susceptible to many different applications and may be utilized any time it is desired to establish one frequency response curve for an IF channel under strong signal conditions and another substantially different response characteristic during the reception of weak signals. In a television receiver where it is contemplated that the picture and the sound IF carriers will always have the same frequencies regardless of received signal strength (as may be the case when automatic frequency control is employed for the local oscillator of the RF tuner), the invention is capable of boosting the response at either or both of the IF carrier frequencies during weak signal reception.

On the other hand, when maximum response is desired for the picture carrier during weak signal reception and it is contemplated that the local heterodyne oscillator will be appropriately detuned by the viewer to displace the picture carrier inwardly (toward the center of the pass-band) to achieve that maximum response (as is the case in the embodiment to be described), the present invention is especially useful in boosting the response of the outwardly displaced sound IF carrier.

Accordingly, it is an object of the present invention to provide a new and improved IF signal amplifying channel for a television receiver.

It is another object to provide a novel IF channel having a variable shaped frequency response curve to optimize tuning under any condition of received signal strength.

It is still another object of the invention to provide an improved IF channel which contributes significantly to the attainment of proper sound reproduction even though the television receiver is intentionally detuned at the time in order to obtain optimum picture reproduction during the reception of television signals of weak signal strength.

It is a further object to provide an IF channel having a boost in its response at frequencies to which the sound IF carrier may be detuned during periods when the received signal strength is weak.

It is a further object to provide an improved IF channel having a response characteristic shaped to accept a sound carrier of a selected frequency on one skirt of its pass-band and which, upon the occurrence of a decrease in received signal strength, boosts its response in the vicinity of a frequency displaced away from the selected frequency by a predetermined amount in a direction away from the center of the pass-band.

The IF channel of the invention is to be incorporated in a television receiver of the type in which a received composite television signal is converted by a radio frequency tuner, which includes a variable frequency heterodyne oscillator, into an intermediate frequency signal containing a modulated picture carrier and a modulated sound carrier having a fixed frequency separation from one another, and in which there is developed an automatic gain control voltage the magnitude of which represents the strength of the received television signal. The intermediate frequency channel amplifies the intermediate frequency signal and, in accordance with one of its aspects, comprises a first transistor amplifying device having a gain and an output resistance determined by an applied bias potential, a second transistor amplifying device, and an interstage coupling network for coupling the output of the first device to the input of the second device. The network includes a tuned circuit the Q of which and also the shape of the overall frequency response characteristic of the IF channel being dependent on the output resistance of the first device. There are means for applying the automatic gain control voltage to the first device to control its bias and to vary its gain and output resistance inversely with received signal strength variations. The output resistance of the first device establishes one frequency response characteristic for the IF channel under strong signal conditions and another substantially different frequency response characteristic under weak signal conditions, at least one portion of the weak signal response characteristic being substantially boosted with respect to the corresponding portion of the strong signal response characteristic.

Figure 2:
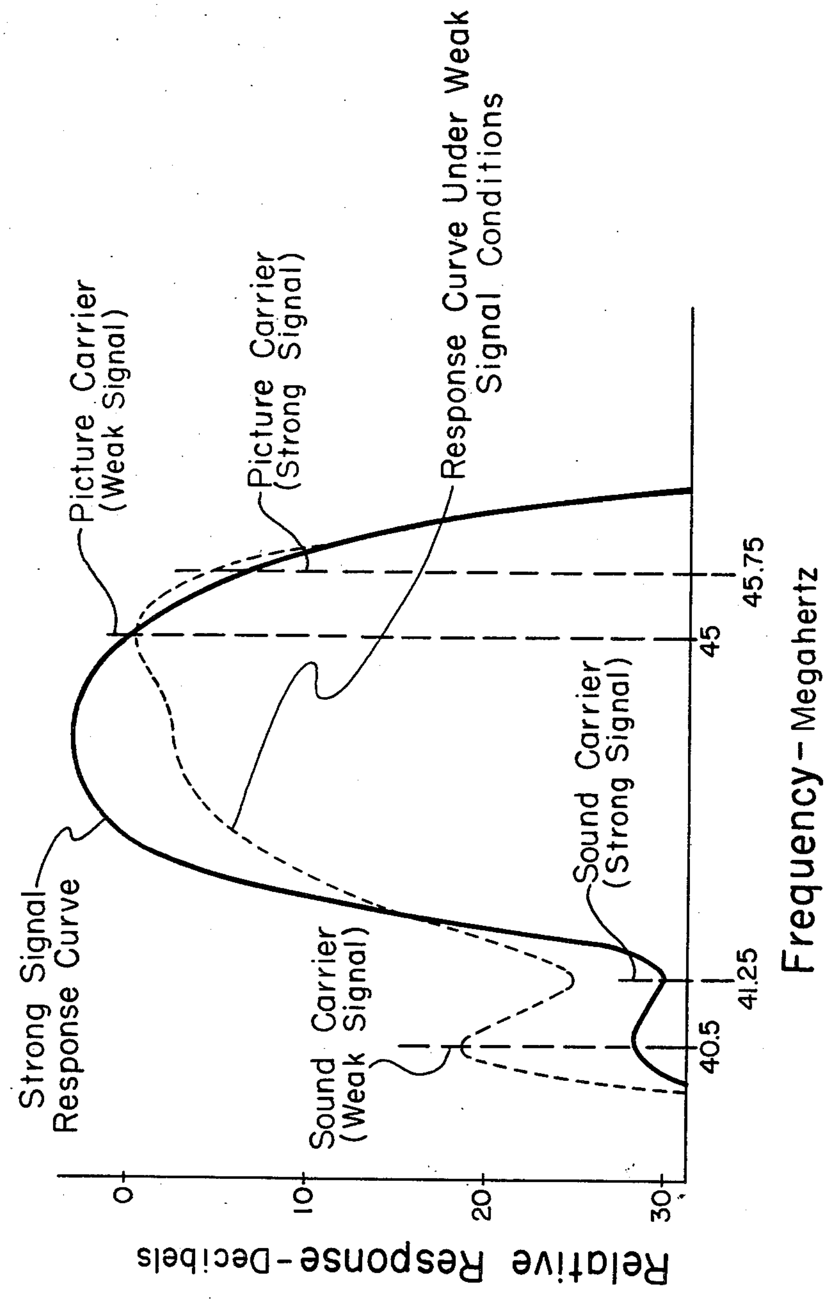

The features of this invention which are believed to be new are set forth with particularity in the appended claims. The invention, together with further objects and advantages thereof, may best be understood, however, by reference to the following description in conjunction with the accompanying drawings in which:

FIGURE 1 is a schematic representation, partially in the form of a block diagram, of a television receiver including an IF channel constructed in accordance with the invention; and FIGURE 2 depicts two frequency response characteristics illustrating the operation of the IF channel of FIGURE 1 under strong and weak signal conditions respectively.

Referring now more particularly to FIGURE 1, the arrangement there represented is a television receiver of the intercarrier type although the invention is applicable to any receiver employing the principle of superheterodyne reception. Moreover, the illustrated television receiver is of the monochrome or black-and-white variety, although it will be obvious that the IF channel of the invention may be employed in a color television set. The representation selected leads to simplification of the drawing, and is not to be considered as a restriction on the application of the invention.

The receiver of FIGURE 1 has a tunable input stage or RF tuner 10 having input terminals connected to a receiving antenna 11. Tuner 10 customarily includes a tunable RF amplifier, a variable frequency heterodyne local oscillator, and a mixer having atuned or frequency-selective output circuit. The tuner facilitates the selection of the composite television signal, conveyed in a particular broadcast channel, from the television signals of the several other channels that are usually available in a given location. Under the television transmission standards existing in the United States, a composite television signal picked up by antenna 11 includes two separate RF carriers, separated in the frequency spectrum by 4.5 megaHertz, one of the carriers being amplitude modulated by the picture or video information while the other is frequency modulated by the sound information. In accordance with the superheterodyne technique, the received RF carriers are beat or heterodyned with the local oscillator signal to produce in the tuned output circuit of the mixer, which provides the output of the RF tuner, an intermediate frequency signal which includes, and is a combination of, an amplitude modulated picture IF carrier and a frequency modulated sound IF carrier having a fixed frequency separation of 4.5 megaHertz from one another. The precise frequencies of the two IF carriers are determined by the operating frequency of the heterodyne oscillator, which may be varied by adjustment of the fine tuning control of tuner 10. In the illustrated receiver, it is contemplated that when the fine tuning control is appropriately manipulated to achieve optimum tuning under normal or strong signal conditions, the heterodyne oscillator will be operating at a frequency that will establish the sound IF carrier at 41.25 megaHertz and the picture IF carrier at 45.75 megaHertz. This is consistent with present industry practice.

The lower output terminal of tuner 10 is connected to a plane of reference potential such as ground, while its upper output terminal is connected to the input of a three-stage transistorized IF amplifying channel 16 which embodies the invention. Ignoring for the moment the structural details of the IF channel, suffice it to say at this juncture that the amplifying channel is capable of amplifying the IF signal, produced in the output of tuner 10, to the extent necessary before video and sound detection. The output of IF channel 16 is coupled to the input of a unit 19 which contains a video detector, for detecting or deriving the video information from the picture IF carrier to develop a composite video sginal, and an amplifier for amplifying the composite video signal. The amplified video signal is then delivered to the input of a picture tube or image reproducer 21.

In accordance with intercarrier practice, an intercarrier component comprising a carrier of 4.5 megaHertz modulated with the sound information is developed in the video detector and separated in a suitable frequency-selective load included in the video amplifier. The intercarrier component is supplied to a conventional audio system 23 which contains appropriate sound demodulating and amplification circuitry and a speaker.

The video amplifier is also coupled to the input of a synchronizing signal separator which separates the horizontal and vertical synchronizing components from the composite video signal for application to suitable sweep systems which in turn effect two-dimensional scanning of picture tube 21. For convenience, the sync separator and sweep systems have been schematically illustrated by a single block 25.

The video amplifier is additionally coupled to one input of an automatic gain control (or AGC) voltage source 26, another input of which is coupled to the horizontal sweep system of unit 25. The AGC source may be of conventional construction and is keyed or gated, by the horizontal sweep system, to examine the amplitude of the sync pulses of the composite video signal, which amplitude represents and is proportional to the strength or level of the picture RF carrier received at the input of RF turner 10, and from such examinations an AGC voltage is developed whose magnitude varies in response to variations in the signal strength of the received composite television signal.

The output of AGC voltage source 26 is coupled to an input of the IF channel to regulate its gain inversely with received signal strength variations in a manner to be explained. Source 26 is also coupled through an AGC delay circuit 28 to an input of RF tuner 10 in order that the gain of the RF amplifier may be controlled. Delay circuit 28 is employed, in accordance with conventional practice, so that gain reduction of the RF amplifier occurs only when the received signal strength exceeds a predetermined level. Until that level is reached, the RF amplifier operates at full or maximum gain.

Aside from the construction of IF channel 16, the described arrangement is a television receiver of conventional design and construction, the operation of which is well understood in the art and need not be further explained. Accordingly, attention will now be directed to the specifics of the three-stage IF channel 16. A filter network 31, provided in the input of the IF channel, includes conventional trap and attenuation circuits for adjusting the relative amplitudes of the signal components supplied to the first IF amplifier stage from tuner 10 in order to preclude adjacent channel interference and also to establish the required amplitude ratio of the picture and sound carriers (namely proper weighting of the carriers) in accordance with the intercarrier principle. More specifically, network 31 customerily includes one attenuation trap tuned to 39.75 megaHertz to reject the picture carrier of the lower adjacent channel, and another attenuation trap tuned to 47.25 megaHertz to reject the sound carrier of the upper adjacent channel. A required amount of attenuation must be given to the accompanying sound carrier so that beat signals which may develop between it and the accompanying picture carrier are unnoticed in the reproduced image. This attenuation is provided by a sound carrier trap circuit having a resonant frequency of 41.25 mergaHertz. The overall frequency response curve for channel 16 is, of course, partially determined by network 31.

The output of network 31 is coupled to the input of the first amplifier stage which comprises a transistor 32 of the bipolar type and NPN gender. The device is coupled in common emitter configuration, its input terminal being connected to its base 33, its common terminal to its emitter 34, and its output terminal to its collector 35. Base 33 is coupled via a capacitor 37 to the upper output terminal of filter network 31, the lower terminal of which is connected to ground. Emitter 34 is connected to ground through a resistor 38 shunted by a capacitor 39. Transistor amplifying device 32 has an output circuit which is tuned to approximately 40.5 megaHertz. More particularly, a capacitor 42 is coupled between collector 35 and ground and the collector is also coupled through the primary winding 43 of a transformer 44 and a series-connected resistor 45 to the positive terminal 46 of a source of DC or unidirectional operating potential, the negative terminal of which is grounded. Winding 43 is shunted by a resistor 47 and the junction of resistors 45 and 47 and winding 43 is bypassed to ground via a capacitor 49.

The tuned circuit, coupled to the output of amplifying device 32, is a parallel resonant circuit and primarily includes capacitor 42 and primary winding 43. Resistor 47 provides partial damping for winding 43 and aids in establishing a nominal Q for tuned circuit 42, 43.

Each of the three IF stages is biased for Class A operation. Resistors 38 and 45 along with potential source 46 establish the operating or working point of the first stage. Hence, those elements will be selected so that the base-emitter junction of transistor device 32 will be forward biased (i.e. base 33 will be positive with respect to emitter 34) at all times and its collector-base junction will be reversed biased. The operating point of the first IF amplifier changes somewhat, however, as a result of the effect of AGC voltage source 26. More specifically, output terminal 51 of source 26 is connected through an isolation resistor 52 to base 33. A bypass capacitor 53 is coupled across the output of source 26 in order to prevent the IF signal from reaching the AGC source or any part of the television receiver other than the IF channel.

Transistor 32 is designed for forward gain control. In other words, the gain of the transistor is reduced by increasing its static emitter current. AGC voltage source 26 must, therefore, be constructed so that the gain control potential produced at terminal 51 will be positive and of a magnitude directly proportional to the received signal strength; the greater the strength of the composite television signal received at antenna 11 and selected by tuner 10, the greater will be the positive AGC voltage at terminal 51. In this way, an increasing AGC potential (in a positive direction) increases the base-emitter bias of transistor 32 which in turn increases its static or quiescent emitter current.

Transistor 32 has an output resistance (namely the resistance between its emitter 34 and collector 35) which varies inversely with changes in the forward bias applied between base 33 and emitter 34. As the forward bias increases, the emitter-collector current increases and the output resistance decreases. Both the gain and output resistance of device 32 therefore vary inversely with received signal strength variations. In accordance with a salient feature of the invention, the Q of tuned circuit 42, 43 is controlled by and dependent on the output resistance of device 32. The coefficient of coupling of transformer 44 is determined by, and is directly proportional to, the Q of tuned circuit 42, 43; hence, the coefficient of coupling is controlled by the output resistance of device 32 and varies inversely with changes in received signal strength.

The output resistance of device 32 varies between a minimum value, under strong signal conditions when device 32 is operating at minimum gain, and a maximum value under weak signal conditions when the device is operating at maximum gain. In order that the variations in output resistance will have a substantial effect on the Q of the tuned circuit 42, 43, resistor 47 has a value very large relative to the minimum value of the output resistance, and is not substantially larger, if at all, than the maximum value of the output resistance. For example, device 32 may have an output resistance of approximately 500 ohms during strong signal reception and a resistance of approximately 10K ohms under weak signal conditions. Adequate control of the Q of tuned circuit 42, 43, and consequently control of the coefficient of coupling of transformer 44, may then be obtained by establishing the resistance of resistor 47 at 10K ohms.

The second IF amplifier stage includes a bipolar transistor 56 of the NPN variety having its emitter 58 connected to ground through a resistor 59 by passed by a capacitor 61. Base 62 of device 56 is coupled through a capacitor 63 to the upper terminal of secondary winding 64 of transformer 44, the lower terminal of which is grounded. A capacitor 60 is coupled between base 62 and ground. Capacitors 60 and 63 and winding 64 provide a tuned secondary circuit tuned to 43.5 megaHertz. Winding 64 is shunted by a resistor 65 which provides partial damping and controls the Q of tuned circuit 60, 63, 64. Thus, the output of amplifying device 32 is coupled to the input of amplifying device 56 by means of an interstage coupling network which includes transformer 44 having its primary winding 43 forming part of a tuned primary circuit and its secondary winding 63 forming part of a tuned secondary circuit. Since the two tuned circuits resonate at different frequencies, the interstage network is stagger-tuned rather than double-tuned.

A capacitor 66 is coupled between collector 67 of device 56 and ground, and that collector is also coupled through the series arrangement of an inductance coil 69 and a capacitor 71 to one input terminal of the third IF amplifier stage, the other input terminal of which is grounded. The junction of coil 69 and capacitor 71 is coupled to ground via a capacitor 73 and is also connected to base 62 through a resistor 74. A resistor 75 connects base 62 to ground. Collector 67 is also connected to positive potential source 46. A by-pass capacitor 81 is coupled between positive source 46 and ground.

Capacitors 66 and 73 and coil 69 form a resonant circuit tuned to 44.5 megaHertz. Resistors 74, 75, 59 and 79 collectively establish the operating point of the second stage for Class A operation. Resistor 79 also provides partial damping of the tuned circuit 66, 73, 69, and resistor 74 also provides negative or degenerative D.C. feedback to achieve conventional bias stabilization.

The third IF amplifier stage may be similar in construction to the second stage. Preferably, however, this third stage is coupled to the video detector of unit 19 by an interstage double-tuned coupling network having both of its resonant circuits tuned to approximately the center of the IF passband.

In considering the operation of the described IF channel, particular reference is made to the two frequency response or band pass curves of FIGURE 2, each of which plots the relative response or gain of the entire IF amplifying channel as a function of signal frequency. The curve shown in full line construction is that which will be obtained under strong signal conditions, while the response characteristic illustrated in dashed construction prevails during the reception of weak signals. The substantially different shapes of the two curves is due in large part to the effect of the output resistance of amplifying device 32. The circuit parameters are selected so that the automatic gain control voltage produced by source 26 during normal or strong signal reception will cause device 32 to have an appropriate value such that the Q of tuned primary circuit 42, 43 effects under-coupling of transformer 44.

With the IF channel exhibiting the strong signal response curve shown in FIGURE 2, optimum tuning will be achieved by the viewer by manipulating the fine tuning control to adjust the heterodyne oscillator of RF tuner 10 so that the picture carrier of the IF signal falls at approximately 45.75 megaHertz and the sound carrier (which is 4.5 megaHertz lower in the spectrum) at 41.25 megaHertz. These particular frequencies are, of course, consistent with current practices in the television industry. The picture carrier is about six decibels (or db) down on the slope at the high frequency end of the band pass characteristic. The sound carrier, on the other hand, is much farther down (about 24 db below the picture carrier response) on the slope at the low end of the response curve. The notch in the strong signal response characteristic at the sound carrier (41.25 megaHertz) is caused by filter network 31 in order that the sound carrier is sufficiently attenuated to prevent image distortion attributable to the intercarrier beat between it and the 45.75 megaHertz picture carrier.

While not specifically shown in FIGURE 2, the skirt selectivity or attenuation under strong signal conditions will be such that the response at frequencies 39.75 and 47.25 megaHertz will be at least 50 db down and thus the picture carrier of the lower adjacent television channel and the sound carrier of the upper adjacent television channel will both be adequately rejected.

In fringe area or weak signal reception, the most satisfactory image display is usually obtained by the viewer if he slightly detunes the heterodyne oscillator in tuner 10 in order that the picture IF carrier falls higher on the response curve. Assuming, for a moment, that the solid line curve of FIGURE 2 prevails for weak as well as strong signal reception, optimum tuning of weak signals would occur when the heterodyne oscillator is operating at the particular frequency necessary to establish the picture carrier at 45 megaHertz. At the same time, because of the fixed 4.5 megaHertz spacing, the sound IF carrier is moved to the lower frequency 40.5 megaHertz and the response at that frequency will be so low (about 28 db down) with respect to the response at 45 megaHertz that an acceptable picture display may be accompanied by very poor sound reproduction.

In accordance with the invention, however, the response curve is modified in the presence of weak signals and is shaped so that sound tuning is substantially improved and optimized at the same time that picture tuning is optimized. Specifically, under weak signal conditions the response of the IF channel is boosted or peaked in the portion of the response characteristic to which the sound carrier is tuned, namely in the vicinity of 40.5 megaHertz. This is shown by the dashed-line curve in FIGURE 2 and is primarily attributable to the effect of the output resistance of device 32. Under weak signal conditions, the AGC voltage increases the gain and output resistance of device 32 with the result that the Q of primary tuned circuit 42, 43 increases which in turn effects an increase in the coefficient of coupling of transformer 44. The circuit parameters are so selected that under weak signal conditions the Q of the primary tuned circuit effects over-coupling of the transformer. Since tuned circuit 42, 43 resonates at 40.5 megaHertz, maximizing the coupling of transformer 44 causes a significant boost in the overall frequency response of the IF channel at 40.5 megaHertz, as shown in FIGURE 2.

It has also been found that the weak signal response curve peaks at 45 megaHertz and this provides easier tuning for the viewer. Note also in the weak signal response curve of FIGURE 2 that as the local oscillator is adjusted to move the picture carrier from 45.75 toward 45 megaHertz (during which time the sound carrier will be moving from 41.25 to 40.5 megaHertz), sound tuning will improve simultaneously with picture tuning. Providing peaks in the response curve at 40.5 and 45 megaHertz simplifies tuning for the viewer since he can tune for either best sound or best picture and he will automatically have the other.

Note also that the difference in response between the picture and sound carriers in the weak signal response curve is substantially less than the response difference existing between those two carriers under strong signal conditions. The 24 db attenuation of the sound carrier relative to the picture carrier for strong signal reception is necessary to prevent the 4.5 megaHertz intercarrier signal component from contaminating the video signal applied to the picture tube and thus introducing distortion in the displayed image. However, in fringe area reception there will usually be a certain amount of noise and this will mask any intercarrier component that may be introduced into the video signal. Hence, it is not necessary to retain the 24 db differential between the responses of the two carriers during weak signal reception. As shown by the dashed-line curve in FIGURE 2, the response at the 40.5 megaHertz sound carrier is only about 18 db down from the response at the 45 megaHertz picture carrier. The sound reproduction is thus given a substantial boost to greatly improve fringe area performance without introducing any noticeable intercarrier distortion in the reproduced image.

The skirt selectivity for the weak signal response curve is essentially the same as that for the strong signal curve; hence, there is adequate protection against adjacent channel interference regardless of the strength of the received television signal. In this connection it should be noted that the pass band has been maintained substantially constant even though the Q of tuned circuit 42, 43 varies considerably with signal strength changes.

One embodiment of the IF channel of FIGURE 1 that has been constructed and successfully operated employed the following circuit components which are given by way of illustration and not limitation of the invention:

| | |
|---|---|
| Capacitor **37** | 100 mfd. |
| Resistor **52** | 1K ohms. |
| Capacitor **53** | .001 mfd. |
| Transistor **32** | Amperex BF467. |
| Resistor **38** | 180 ohms. |
| Capacitor **39** | .002 mfd. |
| Capacitor **42** | 15 pf. |
| Resistor **47** | 10K ohms. |
| Capacitor **49** | .001 mfd. |
| Resistor **45** | 2.7K ohms. |
| Resistor **65** | 2.2K ohms. |
| Capacitor **63** | 26 pf. |
| Resistor **75** | 3.9K ohms. |
| Capacitor **60** | 47 pf. |
| Transistor **56** | Amperex BF 467. |
| Resistor **59** | 680 ohms. |
| Capacitor **61** | .002 mfd. |
| Capacitor **66** | 20 pf. |
| Resistor **79** | 2.2K ohms. |
| Capacitor **81** | .001 mfd. |
| Resistor **74** | 12 K ohms. |
| Capacitor **73** | 75 pf. |
| Capacitor **71** | .001 mfd. |
| Potential source **46** | +24 volts. |

Of course, the invention lends itself to many different variations. By an appropriate selection of parameters, the weak signal response characteristic may be boosted at any desired frequency, such as 41.25 or 45.75 megaHertz. For example, in a television receiver which employs automatic frequency control (or automatic fine tuning) for the local oscillator of the RF tuner the response at 41.25 megaHertz may be boosted under weak signal conditions since the AFC system will retain the sound IF carrier at that frequency. This can be conveniently accomplished by tuning the resonant circuit 42, 43 to 41.25 megaHertz. The attentuation introduced by the 41.25 megaHertz trap in filter network 31 could thus be effectively cancelled during weak signal conditions.

The invention provides, therefore, an improved IF channel having substantially different frequency response curves for strong and weak signal conditions respectively in order to facilitate optimum tuning regardless of signal strength. In the specific case described, improved sound reproduction is achieved when the tuner is detuned for optimum picture reproduction under weak signal conditions.

While a particular embodiment of the invention has been shown and described, modifications may be made, and it is intended in the appended claims to cover all such modifications as may fall within the true spirit and scope of the invention.

I claim:

1. A television receiver in which a received composite television signal is converted by a radio frequency tuner, including a variable frequency heterodyne oscillator, into an intermediate frequency signal containing a modulated picture carrier and a modulated sound carrier having a fixed frequency separation from one another, and in which there is developed an automatic gain control voltage the magnitude of which represents the strength of the received television signal, an intermediate frequency channel for amplifying said intermediate frequency signal comprising:

a first transistor amplifying device having a gain and an output resistance determined by an applied bias potential;

a second transistor amplifying device;

an interstage coupling network, including a tuned circuit, coupling the output of said first device to the input of said second device, the Q of said tuned circuit and the shape of the overall frequency response characteristic of said intermediate frequency channel being dependent on the output resistance of said first device;

and means for applying said automatic gain control voltage to said first device to control its bias and to vary its gain and output resistance inversely with received signal strength variations, the output resistance of said first device establishing one frequency response characteristic for said intermediate frequency channel under strong signal conditions and another substantially different frequency response characteristic under weak signal conditions with at least one portion of the weak signal response characteristic being substantially boosted with respect to the corresponding portion of the strong signal response characteristic.

2. An intermediate frequency channel according to claim 1 in which both of the response characteristics cover approximately the same pass-band in the frequency spectrum and have substantially the same skirt selectivity.

3. An intermediate frequency channel according to claim 1 in which said interstage coupling network includes a transformer having a primary winding forming part of said tuned circuit, thereby constituting a tuned primary circuit, and having a secondary winding forming part of a tuned secondary circuit.

4. An intermediate frequency channel according to claim 3 in which said primary winding is shunted by a fixed resistor of a value very large relative to the output resistance of said first device under strong signal conditions.

5. An intermediate frequency channel according to claim 3 in which the coefficient of coupling of said transformer is controlled by the Q of said tuned primary circuit and varies inversely with changes in received signal strength.

6. An intermediate frequency channel according to claim 3 in which the output resistance of said first device has minimum and maximum values when said first device is operating at minimum and maximum gains respectively, and wherein the Q of said primary tuned circuit effects under-coupling of said transformer when the output resistance of said first device has its minimum value and over-coupling when the output resistance has its maximum value.

7. An intermediate frequency channel according to claim 3 in which said first device is a bipolar transistor having an emitter, a base and a collector and connected in common emitter configuration.

8. An intermediate frequency channel according to claim 3 in which the strong signal response characteristic is shaped to provide optimum tuning when the heterodyne oscillator of the radio frequency tuner is controlled to establish the picture carrier of the intermediate frequency signal at a first predetermined frequency and the sound carrier at a second predetermined frequency, and in which the weak signal response characteristic provides a substantial boost in the vicinity of at least one of said predetermined frequencies.

9. An intermediate frequency channel according to claim 8 in which said tuned primary circuit is tuned to said second predetermined frequency.

10. An intermediate frequency channel according to claim 3 in which the strong signal response characteristic is shaped to provide optimum tuning when the heterodyne oscillator of the radio frequency tuner is adjusted to establish the picture carrier of the intermediate frequency signal at a first predetermined frequency and the sound carrier at a second predetermined frequency, and in which the weak signal response characteristic is shaped to achieve optimum tuning when the heterodyne oscillator is adjusted to establish the picture and sound carriers at frequencies other than said predetermined frequencies.

11. An intermediate frequency channel according to claim 10 in which the sound carrier falls on the low frequency side of the strong signal response characteristic, and in which the weak signal response characteristic is peaked at a frequency lower than said second predetermined frequency in order that optimum sound tuning is achieved when the heterodyne oscillator is adjusted to position the sound carrier at that lower frequency.

12. An intermediate frequency channel according to claim 10 in which the picture carrier is always higher in the frequency spectrum than the sound carrier; wherein said first and second predetermined frequencies fall on the high and low frequency sides respectively of the strong signal response characteristic; in which the weak signal response characteristic provides optimum picture tuning when the heterodyne oscillator is adjusted to displace the picture carrier from said first frequency by a predetermined amount toward the center of the pass band of the response characteristic to a third predetermined frequency; and in which the weak signal response characteristic provides a substantial boost in the vicinity of a fourth predetermined frequency, lower in the frequency spectrum and separated from said second frequency by said predetermined amount, in order that sound tuning is also optimized when picture tuning is optimized.

13. An intermediate frequency channel according to claim 12 in which the weak signal response characteristic is peaked at said third frequency.

14. An intermediate frequency channel according to claim 12 in which the strong signal response characteristic provides a response at said first frequency that is greater than the response at said second frequency by a predetermined number of decibels, and in which the weak signal response characteristic provides a response at said third frequency that is greater than that at said fourth frequency by a number of decibels considerably less than said predetermined number.

References Cited

UNITED STATES PATENTS

| | | | |
|---|---|---|---|
| 2,646,471 | 7/1953 | Cheney | 330—78 |
| 2,774,866 | 12/1956 | Burger | 250—20 |
| 2,901,537 | 8/1959 | Comninos | 178—5.8 |
| 3,025,343 | 3/1962 | Waring | 178—5.8 |
| 3,038,472 | 6/1962 | Proudfit | 250—20 |

ROBERT L. GRIFFIN, Primary Examiner

ROBERT L. RICHARDSON, Assistant Examiner

U.S. Cl. X.R.

330—21, 169